Figure 1:
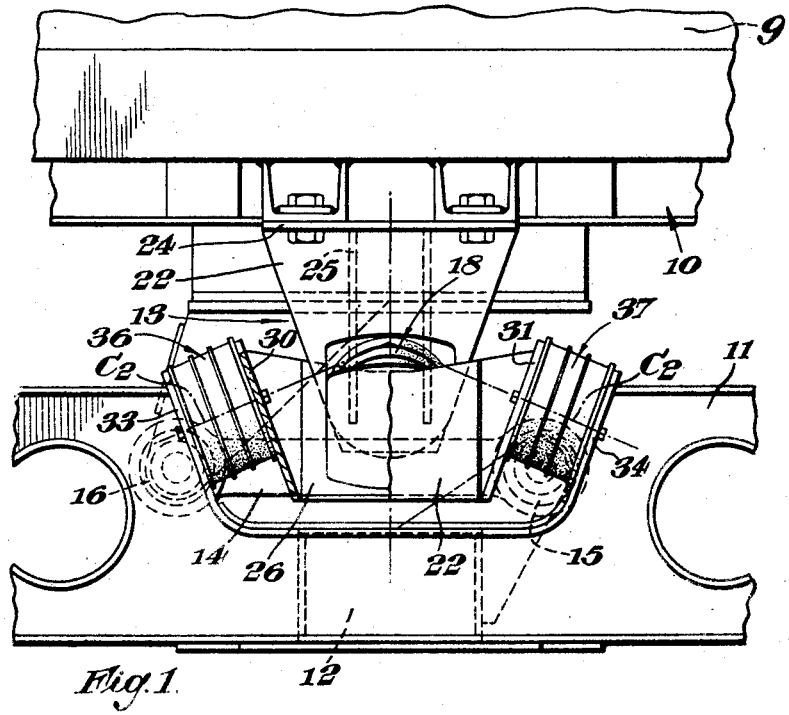

June 29, 1965  A. J. HIRST  3,191,551
RAILWAY VEHICLES
Filed June 4, 1963  4 Sheets-Sheet 1

ARCHIE JOHN HIRST
By John W. Pease
ATT'y

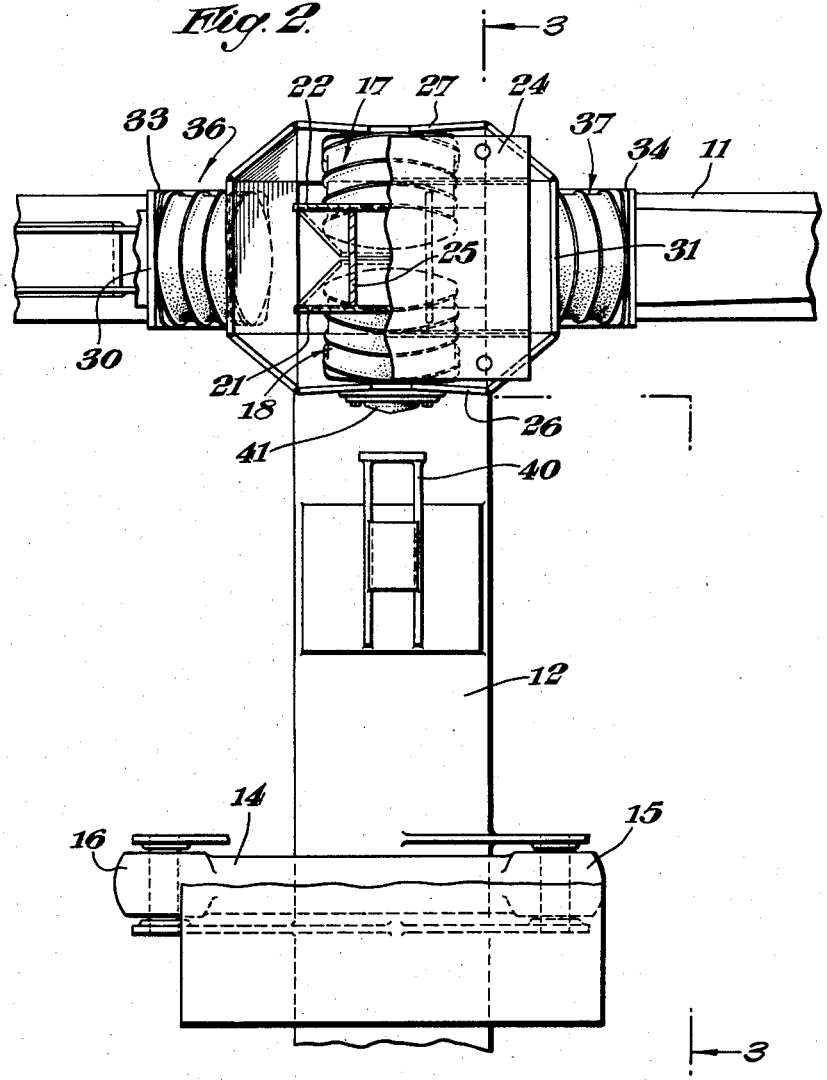

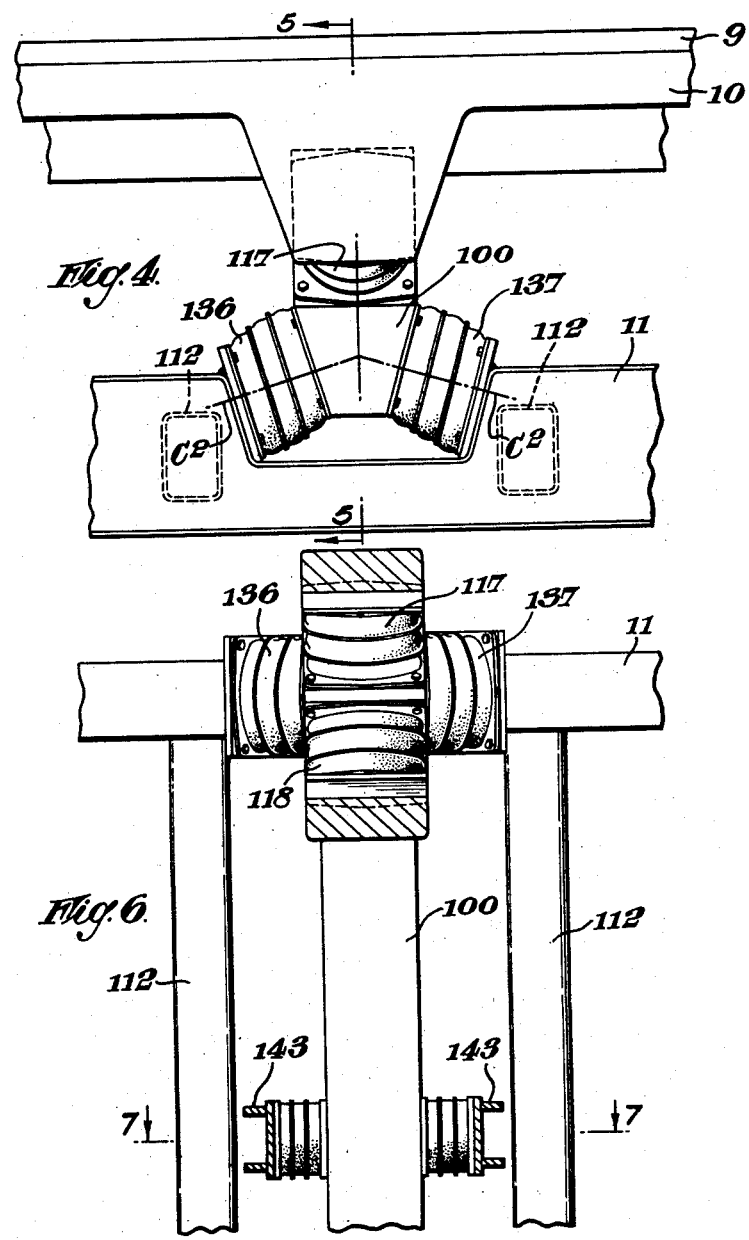

June 29, 1965   A. J. HIRST   3,191,551
RAILWAY VEHICLES

Filed June 4, 1963   4 Sheets-Sheet 4

ARCHIE JOHN HIRST
BY
ATT'Y

3,191,551
RAILWAY VEHICLES
Archie John Hirst, Leicester, England, assignor to Metalastik Limited, Leicester, England, a British company
Filed June 4, 1963, Ser. No. 285,494
Claims priority, application Great Britain, June 6, 1962, 21,930/62
12 Claims. (Cl. 105—453)

This invention relates to railway vehicles and concerns a suspension for a railway vehicle for supporting the body of the vehicle from a wheel-carrying frame of the vehicle.

The invention is applicable to railway vehicles having bolsterless bogies, the vertical load of the vehicle body being wholly or mainly carried by suspensions according to the invention, directly onto the wheel-carrying frames of the bogies. In this case each suspension is usually referred to as a side bearer assembly, and this terminology will be adopted in the present specification.

The degree of vertical load carried by a side bearer assembly in a bolsterless bogie construction depends on whether there is a centre pivot and if so the proportion of the load taken by the pivot. There may be a pivot mounting directly between the body and the wheel-carrying frame of the bogie which has significant vertical stiffness and, accordingly, load carrying capacity.

A suspension according to the present invention may however be applied to a bolstered bogie and employed both to support one end of the bolster from the wheel-carrying frame of the bogie and the vehicle body from the bolster, the bolster, of course, carrying a centre pivot for the bogie. In this case the centre pivot may carry a substantial part of the vertical load of the vehicle body but preferably the centre pivot is an unloaded pivot (i.e. of very small load capacity), the vertical load of the vehicle body applied to the bolster being transferred wholly or mainly to the wheel-carrying frame by the bolster suspension without passing through the centre pivot.

According to the present invention, there is provided, in a railway vehicle, a suspension supporting the body of the vehicle from a wheel-carrying frame of a bogie of the vehicle, the suspension being arranged towards one side of the vehicle and being paired with a corresponding suspension on the other side of the vehicle, the suspension comprising a rubber or the like material (hereinafter referred to as rubber) spring block which has its compression axis inclined to the vertical so that the block acts in combined shear and compression to support the vertical load of the vehicle body from the wheel-carrying frame and so that the block resists horizontal transverse movement of the body relative to the wheel-carrying frame also in combined shear and compression, the spring block permitting horizontal longitudinal movement of the body relative to the wheel-carrying frame wholly or mainly by shear deformation, and rubber spring means in series with said spring block and acting in combined shear and compression to support the vertical load of the vehicle body from the wheel-carrying frame, the rubber spring means permitting transverse horizontal movement of the body relative to the wheel-carrying frame wholly or mainly by shear deformation.

With a suspension as just defined, the horizontal longitudinal movements of the body relative to the wheel-carrying frame, accommodated in shear by the rubber spring block, give the necessary freedom for pivoting of the wheel-carrying frame relative to the vehicle body on negotiating curves in the track because rubber is comparatively flexible in shear. Thus, the positioning of the suspension towards one side of the vehicle allows pivoting of the wheel-carrying frame by means of substantially relative horizontal longitudinal movement between the body and the frame at the radius of the rubber spring block over the angle of pivoting required and, therefore, mainly by shear deformation of the rubber spring block.

The suspension is conveniently situated over a main side member i.e. a sole bar of the wheel-carrying frame but it could be positioned outside the sole bar to give a wider transverse spacing of the paired suspensions if the roll stiffness is required to be increased.

In the transverse horizontal direction, the flexibility of the body on the wheel-carrying frame is provided mainly by the rubber spring means acting wholly or mainly in shear. The rubber spring block acts in combined shear and compression in the transverse horizontal direction and in consequence it much more strongly resists transverse horizontal displacement of the body on the wheel-carrying frame.

Since transverse flexibility is provided by rubber acting wholly or mainly in shear, a relatively large transverse flexibility may be obtained.

In the vertical direction a high deflection is obtained due to the fact that both the rubber spring block and the rubber spring means act in series in combined shear and compression in this direction, and each is able therefore to contribute a significant vertical deflection to the assembly as a whole.

In one arrangement, according to the present invention, in a railway vehicle having a bolsterless bogie and in which the suspension constitutes a compound side bearer assembly supporting the body of the vehicle directly from the wheel-carrying frame, the rubber spring means supports the rubber spring block from the wheel-carrying frame, and the rubber spring block supports the vehicle body from the rubber spring means.

In this case, of course, it is necessary to relieve the side bearer assembly of the traction and braking forces to be transmitted between the vehicle body and wheel-carrying frame, and to this end a traction linkage is provided connecting the body to the wheel-carrying frame. The traction linkage may comprise a simple traction link disposed along the longitudinal centre line of the vehicle and pivoted at one end to the vehicle body and at its other end to the wheel-carrying frame, the link offering a large resistance to longitudinal traction and braking loads but little or no resistance to vertical, transverse or angular movements of the vehicle body relative to the wheel-carrying frame.

Alternatively however, a traction linkage as described and claimed in British Patent No. 839,336 may be used since this can modify the transverse horizontal stiffness characteristics of a side bearer assembly according to the present invention in an advantageous manner, e.g. by adding negative transverse stiffness for at least an initial transverse deflection range and also by introducing a transverse stiffness component which is variable dependent upon the load of the vehicle body.

A principal advantage which is believed to be obtained using a side bearer assembly according to the present invention is the larger vertical flexiblity which it will undoubtedly afford, coupled with a comparatively small change of horizontal stiffness with the change of vertical load throughout the deflection range. Thus, it is thought that no additional stabilising means will be required for the assembly. However, a transverse stabilising plank connected between the pair of the side bearer assemblies could be employed if necessary, as hereinafter described in greater detail by way of example.

In an alternative arrangement of the suspension according to the present invention in a railway vehicle having a bolstered bogie, the rubber spring means may support one end of a bolster, the bolster having a centre pivot connection with the vehicle body and in turn carrying the rubber spring block which supports the vehicle body from said one end of the bolster. The centre pivot may be of the cylindrical rubber bush type, so as to lend very little load carrying capacity. Again, it could be formed by a pair of rubber sandwich mountings one on each side of the bolster and connecting the bolster to the wheel carrying frame, the mountings being disposed with their compression axes lying along the longitudinal centre line of the vehicle so that they transmit the vertical loading in shear and accordingly add very little load carrying capacity. Alternatively, the centre pivot could be of the frusto-conical rubber bush type so as to carry a substantial part (e.g. a third) of the vertical load.

The rubber spring means, if it supports the end of a bolster, constitutes a bolster spring, and the rubber spring block itself a side bearer, in accordance with the usual terminology, there of course being two bolster spring means one towards each end of the bolster and at least two side bearers one towards each end of the bolster.

The bolster springing must, of course, be at such a height in relation to the bolster centre pivot that the longitudinal traction and braking forces transmitted through the centre pivot do not tend to tip the bolster about a transverse horizontal axis but the height of the side bearers is not significant from this point of view. The transverse spacing of the side bearers may be less, equal to or more than the bolster springing but sufficient spacing must of course be retained to provide adequate roll stiffness.

The bolster springing preferably comprises a pair of rubber spring blocks (hereinafter termed rubber springs) disposed respectively fore-and-aft of the bolster in the longitudinal direction of the vehicle. The rubber springs could however be disposed within the bolster which in this case is made hollow.

According to a further feature of the present invention, the suspension may comprise a pair of said rubber spring blocks which are transversely spaced of the vehicle and which have their compression axes oppositely inclined in a common transverse vertical plane of the vehicle, each block acting in combined shear and compression to support the vertical load of the vehicle body from the wheel-carrying frame, one of the blocks resisting, in combined shear and compression, relative transverse horizontal movement of the body relative to the wheel-carrying frame in one direction, and the other of the blocks resisting, in combined shear and compression, relative transverse horizontal movement of the body relative to the wheel-carrying frame in the other direction.

This feature is particularly preferred in the case of a compound side bearer assembly according to the present invention.

It is also preferred in that case that the rubber spring means is constituted by a pair of spring blocks (hereinafter termed rubber springs) disposed respectively fore-and-aft of the aforesaid transversely spaced rubber spring blocks, in the longitudinal direction of the vehicle, the rubber springs supporting between them a trough structure having a pair of confronting walls spaced transversely of the vehicle, said walls in turn supporting the aforesaid rubber spring blocks which are located wholly or mainly within the trough structure on approximately the same level as the rubber springs.

The rubber springs preferably afford, in a longitudinal vertical plane of the vehicle, an effective point of suspension to the trough structure which lies above the level of the effective point of suspension afforded, in a transverse vertical plane, to the vehicle body by the rubber spring blocks located within the trough structure.

Preferably also, the effective point of suspension which is afforded by the rubber spring blocks in the transverse vertical plane is at the same level or approximately the same level as the centres of the rubber springs.

By having the trough structure suspended for vertical loading at a point above that at which the body load is applied to the trough structure a positive pendulum or swing link effect is obtained.

By having the point at which the body load is applied to the trough structure on a level with the centres of the springs supporting the trough structure the trough structure is rendered free of any tendency to tilt due to side load in the horizontal transverse or longitudinal direction.

This does not mean however that there is no tendency for the trough structure to tilt because when the body is displaced transversely relative to the wheel-carrying frame a couple is produced acting on the trough structure due to the offsetting of the vertical load of the body relative to the bogie. At any given vertical loading condition of the body there is a relative height of the two pairs of springs at which the positive pendulum or swing link effect balances the overturning moment due to the offset of the vertical load, but since the equivalent pendulum length must increase in proportion to the vertical load and tends to be much larger than can be accommodated in a compound side bearer design some tilting of the trough structure is essential to achieve equilibrium of the forces and couples which are brought into play under all but very specialised conditions.

The tilting of the trough structure which is likely to take place is a measure of the transverse stability of the side bearer assembly and the tilting and therefore the reduction in transverse stability is much less if the rubber spring blocks located in the trough structure are made rectangular or oval with their major axes disposed in vertical planes.

Figure 3:
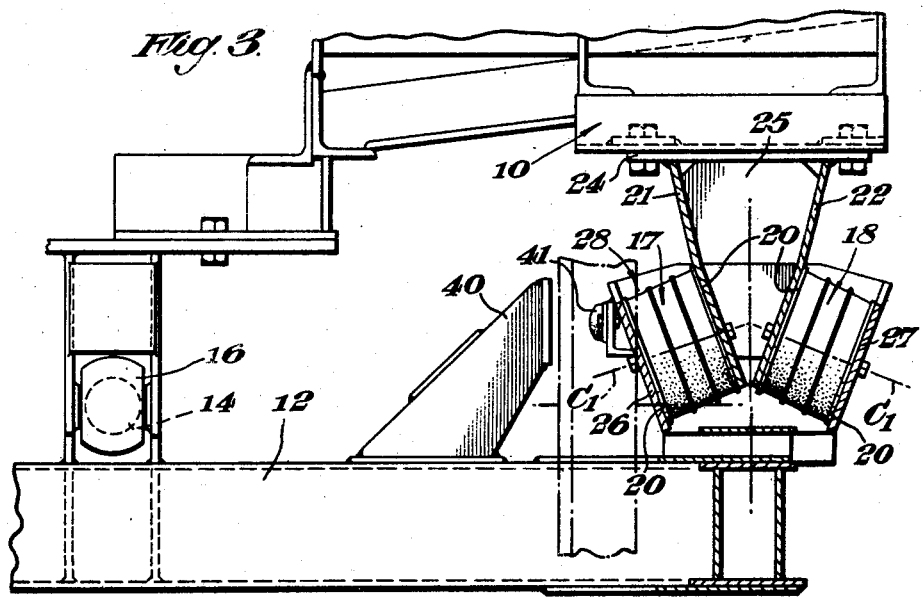
Figure 5:
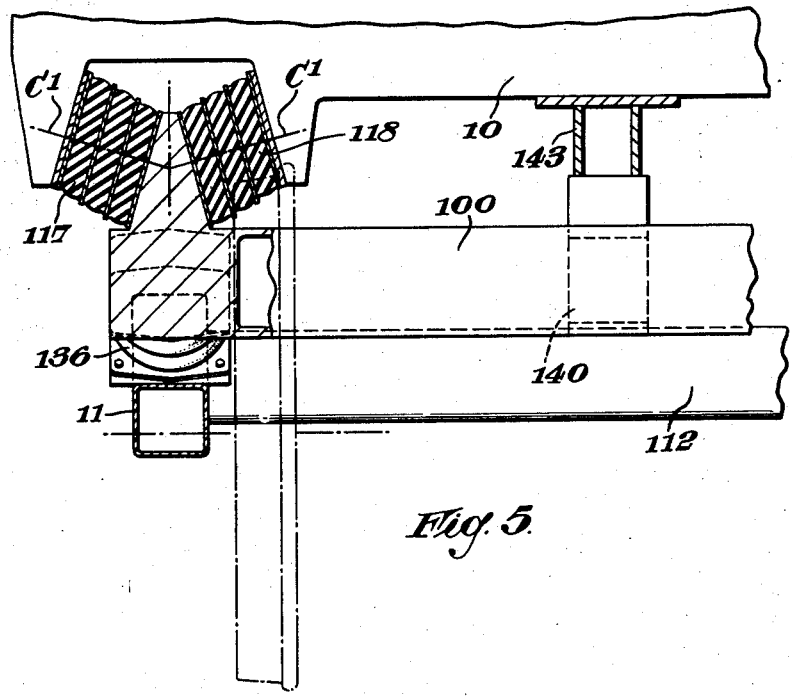
Figure 7:
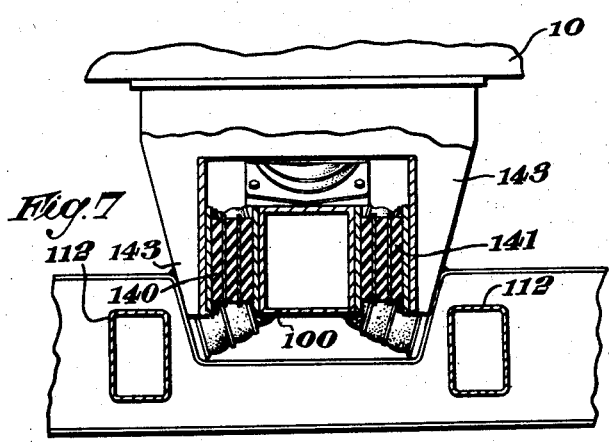

Specific embodiments of the present invention will now be described, merely by way of example, with reference to the accompanying drawings whereof:

FIG. 1 is a side elevation, in part in section, of a suspension according to the present invention and constituting a compound side bearer assembly for a railway vehicle having bolsterless bogies, FIG. 2 is a plan view, in part in section, of the side bearer assembly as shown in FIG. 1, FIG. 3 is a section on line 3—3 in FIG. 2, FIG. 4 is a side elevation of a further suspension according to the present invention for a railway vehicle having bolstered bogies, the suspension supporting one end of a bolster from a wheel-carrying frame of a bogie and the vehicle body from the bolster, FIG. 5 is a section on line 5—5 in FIG. 4, FIG. 6 is a plan view of the suspension shown in FIG. 4, and FIG. 7 is a section on line 7—7 in FIG. 6.

Referring to the drawings in which like parts are indicated by corresponding reference numerals, 10 indicates the underframe of the vehicle body 9, while at 11 is indicated a main sole bar of a wheel-carrying frame of a bogie of the vehicle. The side bearer assembly, generally indicated at 13, is located directly over the main sole bar 11.

Between the main sole bar 11 and the corresponding sole bar on the other side of the bogie, a transom 12 is provided.

The side bearer assembly which is being described is paired with a further side bearer assembly of the same construction but situated on the other side of the vehicle between the vehicle body and the other main sole bar of the bogie and directly over the other main sole bar. The two side bearer assemblies are arranged in a common transverse vertical plane.

For transmission of the longitudinal traction and braking forces between the vehicle body 9 and the bogie frame, the underframe 10 of the body is connected to the bogie frame by means of a longitudinal traction link 14 disposed along the centre line of the vehicle. The link 14 is connected respectively to the transom 12 and the underframe 10 by pivot joints 15 and 16 of the kind including a part-spherical interlayer of rubber which by distortion permits relative movement of the joint members in all angular directions. The link 14 thus permits relative vertical, transverse and pivoting movements between the vehicle body and the bogie frame, whilst at the same time strongly resisting movement of the body relatively to the bogie in the longitudinal fore-and-aft direction.

Instead of the link 14, any known or convenient equivalent device may be used, and reference to this will hereinafter be made in greater detail.

The side bearer assembly comprises a pair of rubber spring blocks 17, 18 having their compression axes $C_1$ (see FIG. 3) oppositely inclined, at a large angle to the vertical, in a transverse vertical plane, the rubber spring blocks 17, 18 lying closer together at their upper ends than their lower ends and being bolted by means of their upper end plates 20 respectively to a pair of longitudinally extending transversely spaced plates 21, 22 arranged in V-formation and bolted by means of an upper end attachment plate 24 to the underframe 10. The depending structure formed by the plates 21, 22 and the attachment plate 24 is strengthened by a further pair of web plates 25, the whole structure being of welded plates.

The lower end plates 20 of the rubber spring blocks 17, 18 are bolted respectively to longitudinally extending, transversely spaced confronting walls 26, 27 of an inverted four sided truncated-pyramid-shaped trough structure 28, of welded plate construction, the rubber spring blocks 17, 18 lying wholly within the trough.

Bolted by means of end plates between the other pair of confronting walls 30, 31 of the trough structure 28 and confronting walls 33, 34 on the sole bar 11 is a pair of rubber spring blocks 36, 37 (hereinafter termed rubber springs) acting in series with the rubber spring blocks 17, 18 to support the vertical load of the vehicle body from the bogie frame. The rubber springs 36, 37 have their compression axes $C_2$ (see FIG. 1) inclined at a large angle to the vertical in a vertical longitudinal plane of the vehicle, the rubber springs 36, 37 extending upwardly from the sole bar 11 to the trough structure 28 with their upper ends closer together than their lower end. The confronting walls 33, 34 are inclined so as to be parallel with the walls 30, 31 respectively of the trough structure 28. The walls 33, 34 are themselves defined by longitudinally spaced walls of a trough-like depression in the sole bar 11 and are constituted by the end parts of a trough shaped plate forming part of the welded plate structure of the sole bar.

By locating the rubber springs 36, 37 in a trough-like depression in the sole bar, the side bearer is carried low down in relation to the top of the sole bar and close to the horizontal plane of the wheel axles.

The rubber spring blocks 17, 18 and the rubber springs 36, 37 are composed of rubber discs or pads bonded to disc-form metal interleaves, the end discs or pads of rubber also being bonded to the metal end plates described. The pads and interleaves of the spring blocks 17, 18 may be elongated with their longer dimension disposed in the transverse vertical plane containing their compression axes.

The rubber spring blocks 17, 18 due to the setting of their compression axes $C_1$, support the vertical load of the vehicle body 9 in combined shear and compression in the rubber and give rise in themselves to a significant vertical deflection because of the large angle of inclination which their compression axes have to the vertical. They however resist transverse horizontal movement of the body 9 relative to the bogie frame in combined shear and compression but mainly in compression due to the large angle of inclination of their compression axes to the vertical. Due to this the rubber spring blocks 17, 18 are very much stiffer in the transverse horizontal direction than in the vertical direction. In the longitudinal direction the rubber spring blocks 17, 18 deflect wholly in shear and therefore relatively freely. Thus pivoting of the bogie is readily permitted mainly by deformation of the rubber spring blocks 17, 18 which may be designed to have a negative shear stiffness at least over an upper part of the designed load range of the vehicle body.

The rubber springs 36, 37 due to the setting of their compression axes $C_2$, support the vertical load of the vehicle body in combined shear and compression in the rubber and in turn add significantly to the vertical deflection afforded by the rubber spring blocks 17, 18. They also give the necessary transverse flexibility, since in the transverse horizontal direction these springs deflect wholly in shear.

A buffer stop 40 is incorporated, carried by transom 12, to engage with a rubber buffer 41 carried by the trough structure 28 to limit the maximum transverse deflection permitted to the vehicle body 9 relative to the bogie frame in one direction. In the other direction, equivalent limiting buffer means is provided on the other side of the bogie. The rubber buffers 41 are preferably at the height of the point of intersection of the axes $C_1$ under normal loading conditions.

With the construction of side bearer assembly described, the relative height of the rubber springs 36, 37 and the rubber spring blocks 17, 18 is of importance and preferably, to achieve the necessary stability, the metacentre that is to say, the effective centre of suspension afforded by, the rubber springs 36, 37 lies above that of the rubber spring blocks 17, 18, and the metacentre of the spring blocks 17, 18 lies at least approximately on a level with the centres of the springs 36, 37.

Side bearer assemblies as described can offer considerable advantages when used in conjunction with a toggle link traction linkage which is constructed and arranged as described in British Patent 839,336 this in replacement of the simple traction link 14 which has hereinbefore been described. Thus, for example, the transom 12 may be replaced by a pair of spaced apart transoms interconnected with the lower end of a column depending from the body frame 10 between them by a pair of links arranged longitudinally of the vehicle and in alignment with one another in the normal transverse position of the body relative to the bogie, the links being pivoted at their inner ends to the lower end of the column and at their outer ends respectively to the transoms, the pivots including rubber pivot bushes, all as shown in the drawings of British Patent No. 839,336. Alternatively, the links could be pivoted at their inner ends on top of the transom 12 with their outer ends connected to the under frame of the body as described in British Patent 839,336. With either arrangement, positive stiffness may be created against transverse horizontal movement of the body in either direction from its normal position relative to the bogie due to tension in the traction links subjecting the rubber bush pivots to radial compression. Using a traction linkage as just referred to, the positive stiffness against relative transverse displacement of the body relative to the bogie afforded by the traction linkage may counter-balance a negative transverse stiffness in side bearer assemblies as described. Furthermore, since the transverse stiffness of the traction linkage increases rapidly as the body is deflected vertically on the bogie with increase of load in the vehicle body, due to the fact that the traction links then tend to be stretched in a vertical plane thereby increasing the radial compression in the link pivots, reduction of transverse stiffness of the side bearer assemblies with increase of load thereon is also compensated.

The traction linkage may provide a positive stiffness against transverse horizontal movement of the body on the bogie under all conditions of loading, in which case, under tare load conditions, the links, in their in line position, may be either unstressed or preloaded in tension in their lengthwise direction. Alternatively however, under tare load conditions, the traction linkage may have a negative or zero transverse stiffness, and the side bearers a positive transverse stiffness, the variation of geometry in the traction linkage due to increasing load altering the transverse stiffness characteristics of the linkage such that at full load conditions, the linkage provides a substantial positive transverse stiffness to counteract pronounced negative transverse stiffness in the side bearer assemblies due to the high vertical loading conditions on the assemblies then existing, thereby to keep the transverse stiffness at least approximately proportional to the load. To achieve negative or zero stiffness in the traction linkage the links, in their in line position, are of course arranged to be preloaded lengthwise in compression.

A traction linkage as just described may also be used to increase the vertical flexibility of the suspension at tare load and decrease the vertical flexibility at full load, and this may be of considerable advantage where a wide loading range is concerned.

In addition to or instead of using a traction linkage as described immediately above, the trough structures 28 of a pair of transversely spaced side bearer assemblies as described above may be interconnected by a rigid transverse plank to assist in increasing the transverse stability of the side bearer assemblies so connected.

Referring now to FIGS. 4, 5, 6 and 7 rubber springs 136, 137 arranged in the same way as springs 36, 37 support one end of a bolster 100 having a central pivot connection with the underframe 10, springs 117, 118 corresponding generally in arrangement with springs 17, 18 but being provided carried at a much higher level on top of the bolster between the bolster and the underframe 10 and supporting the vehicle body from the bolster. The bolster springs support the bolster from the wheel-carrying frame of the bogie comprising sole bars 11 as before, the sole bars being interconnected by a pair of transoms 112 one on each side of the bolster.

The springs 136, 137 may be located inside a hollow bolster and have their compression axes $C_2$ directed upwardly in divergent fashion instead of upwardly in a convergent fashion as shown. In similar fashion, the springs 117, 118 have their compression axes $C_1$ directed upwardly in divergent fashion instead of downwardly in divergent fashion like the springs 17, 18. The springs 117, 118 function in the same way as the spring 17, 18 however the only difference being that the arrangement is inverted.

The central pivot connection may take any of the forms hereinbefore referred to. In the present example it comprises a pair of sandwich mountings 140, 141 disposed one on each side of the bolster with their compression axes lying along the longitudinal centre line of the vehicle as shown. The mountings 140, 141 are composed of pads of rubber with bonded interleaves and end plates and are bolted in position between the bolster and structures 143 depending from the underframe 10. The mountings 140, 141 are stressed purely in shear by the vertical loading and accordingly add very little vertical load carrying capacity as previously explained. They permit pivoting of the bolster about a central vertical axis and accordingly pivoting of the bogie in relation to the vehicle body when the vehicle negotiates curves in the track. The mountings 140, 141 transmit the traction and braking forces between the vehicle body and the bogie in compression and in this respect they replace the traction linkage previously described.

The mountings 140, 141 may be precompressed sufficiently to have negative shear stiffness thus giving similar effects as a toggle link traction linkage with an initial transverse negative stiffness as hereinbefore described.

In the construction described with reference to FIGS. 4 to 7 it will be understood that a corresponding suspension is provided as before at the other side of the vehicle and having springs 136, 137 supporting the other end of the bolster 100 from the frame 11. Likewise springs 117, 118 are provided supporting the vehicle body from the bolster at the other end of the bolster.

The mountings 140, 141 could be positioned between the transoms 112 and a frame bracket which bridges the structure 100 and presents structures like 143 having faces confronting side faces on the transoms for attachment of the mountings. In this case the structure 100 assumes the role of a plank tying the compound side bearers together transversely.

The rubber springs 36, 37 or 136, 137 and/or the rubber spring blocks 17, 18 or 117, 118 may have sealed hollow interiors connected with a source of compressed air, the springing provided by the springs and/or blocks in this way being supplemented pneumatically at least under certain conditions, for example, to maintain a datum level for the body 9 of the vehicle irrespective of the load in the body or more simply to limit the vertical deflection of the body on the bogie under full and overload whilst providing good riding at light loading.

By using the spring or spring blocks also as air springs, the possibility of a combined air and rubber suspension is offered in which the volume of air is not excessive, and in which the rubber springing itself gives spring support under conditions in which the pneumatic system is inoperative e.g. under tare load conditions with the braking system which is used to supply the compressed air for the pneumatic springing, decoupled, the rubber springing alone then supporting the body at the datum height for example.

The compound side bearer assembly described with reference to FIGS. 1 to 3 may be given a slight inward inclination from bottom to top as viewed in FIG. 3. Again the axes $C_2$ of the springs 36, 37 may be given an inward as well as upward inclination but the trough structure 28 and the springs 17, 18 retained upright.

In the suspension shown in FIGS. 4 to 7 the springs 136, 137 may be inwardly inclined to a small angle so as to give a greater restoring force to the bolster when it is displaced transversely of the vehicle, i.e. in the direction of its length. In this case the bolster springing resists transverse displacement of the vehicle body relative to the wheel-carrying frame in combined shear and compression but mainly in shear due to the small inward angle of inclination of the bolster springs.

I claim:

1. In a railway vehicle, a suspension supporting the body of the vehicle directly from a wheel-carrying frame of a bogie of the vehicle, the suspension being arranged towards one side of the vehicle and being paired with a corresponding suspension on the other side of the vehicle, the suspension comprising a rubber spring block which has its compression axis inclined to the vertical and set in a transverse vertical plane of the vehicle so that the block acts in combined shear and compression to support the vertical load of the vehicle body from the wheel-carrying frame and so that the block resists horizontal transverse movement of the body relative to the wheel-carrying frame also in combined shear and compression, the spring block permitting horizontal longitudinal movement of the body relative to the wheel-carrying frame at least in the main by shear deformation whereby pivoting of the bogie relative to the body is permitted, and rubber spring means arranged in series with said spring block and acting to transmit the vertical load supported thereby between the vehicle body and the wheel-carrying frame in combined shear and compression in the rubber, the rubber spring means comprising a pair of rubber springs having their compression axes arranged in V formation in a longitudinally extending plane of the vehicle whereby the rubber spring means permits transverse horizontal movement of the body relative to the wheel-carrying frame substantially wholly by shear deformation.

2. A railway vehicle as claimed in claim 1 wherein the bogie is a bolsterless bogie and the rubber spring means of each suspension supports the body of the vehicle directly from the wheel-carrying frame of the bogie, through the rubber spring blocks the rubber spring blocks engaging the vehicle body and the rubber spring means engaging the wheel-carrying frame.

3. A railway vehicle as claimed in claim 1, wherein the bogie includes a bolster and the rubber spring means of said first said suspension supports one end of the the bolster the other end of which is supported by the rubber spring means of said corresponding suspension on the other side of the vehicle, the bolster having a centre pivot connection with the vehicle body and in turn carrying the rubber spring blocks of the two suspensions, the rubber spring blocks supporting the vehicle body from the bolster.

4. A railway vehicle as claimed in claim 1, wherein each suspension comprises a pair of said rubber spring blocks which are transversely spaced of the vehicle and which have their compression axes oppositely inclined in a common transverse vertical plane of the vehicle, each block acting in combined shear and compression to support the vertical load of the vehicle body from the wheel-carrying frame, one of the blocks resisting, in combined shear and compression, relative transverse horizontal movement of the body relative to the wheel-carrying frame in one direction, and the other of the blocks resisting, in combined shear and compression, relative transverse horizontal movement of the body relative to the wheel-carrying frame in the other direction.

5. A railway vehicle as claimed in claim 4, wherein the bogie is a bolsterless bogie and each suspension supports the body of the vehicle directly from the wheel-carrying frame of the bogie, said rubber spring means supporting said rubber spring blocks from the wheel-carrying frame and the rubber spring blocks supporting the vehicle body from the rubber spring means, said pairs of rubber springs being disposed with the springs of each pair respectively fore and aft of the aforesaid transversely spaced rubber spring blocks in the longitudinal direction of the vehicle, the rubber springs of each suspension supporting between them a trough structure having a pair of confronting walls spaced transversely of the vehicle, said walls of said trough structure in turn supporting the rubber spring blocks of the suspension which are located substantially wholly within the trough structure on approximately the same level as the rubber springs.

6. A railway vehicle as claimed in claim 5, wherein the rubber springs of each suspension afford, in a longitudinal vertical plane of the vehicle, an effective point of suspension to the trough structure which lies above the level of the effective point of suspension afforded in a transverse vertical plane of the vehicle, to the vehicle body by the rubber spring blocks located in the trough structure.

7. A railway vehicle as claimed in claim 6, wherein the effective point of suspension which is afforded by the rubber spring blocks in the transverse vertical plane is at the same level or approximately the same level as the centres of the rubber springs.

8. A railway vehicle as claimed in claim 5, wherein the rubber springs of each suspension are located in a trough-like depression in a sole bar of said wheel-carrying frame so that the side bearer assembly is carried low down in relation to the top of the sole bar and close to the horizontal plane of the wheel axles.

9. A railway vehicle as claimed in claim 5, wherein the rubber spring blocks and the rubber springs are composed of rubber discs or pads bonded to metal interleaves, each spring and spring block having a bonded-on metal end plate at each end, the pads and interleaves of the spring blocks being of elongated form with their longer dimension disposed in said common transverse vertical plane of the vehicle.

10. A railway vehicle as claimed in claim 5, wherein the trough structure of each suspension carries a buffer to co-operate with a stop on the wheel-carrying frame to limit the maximum transverse deflection permitted to the vehicle body relative to the bogie frame in one direction, and the buffer is at the height of the point of inter-section of the compression axes of said spring blocks under normal loading conditions of the vehicle.

11. A railway vehicle as claimed in claim 5, wherein said trough structures are interconnected by a rigid transverse plank thereby to increase the transverse stability of the suspensions.

12. A railway vehicle as claimed in claim 2, wherein said rubber spring means of each suspension supports an intermediate structure which in turn supports the rubber spring block of the suspension and said intermediate structures are interconnected by a rigid transverse plank thereby to increase the transverse stability of the suspensions.

References Cited by the Examiner

UNITED STATES PATENTS

| | | | |
|---|---|---|---|
| 2,272,426 | 2/42 | Nystrom et al. | 105—200 |
| 2,499,087 | 2/50 | Bourdon | 105—199 |
| 2,777,401 | 1/57 | Rossell | 105—197 |
| 2,954,747 | 10/60 | Hirst et al. | 105—453 |
| 2,981,207 | 4/61 | Paulsen | 105—200 |

MILTON BUCHLER, *Primary Examiner.*

LEO QUACKENBUSH, *Examiner.*